United States Patent
Pollack et al.

(10) Patent No.: US 10,867,612 B1
(45) Date of Patent: Dec. 15, 2020

(54) PASSIVE AUTHENTICATION THROUGH VOICE DATA ANALYSIS

(71) Applicant: United Services Automobile Association (USAA), San Antonio, TX (US)

(72) Inventors: Jeffrey Neal Pollack, San Antonio, TX (US); Michael E'shawn Weaver, Seminole, FL (US); Andrew L. Anaruk, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 81 days.

(21) Appl. No.: 16/168,143

(22) Filed: Oct. 23, 2018

Related U.S. Application Data

(60) Provisional application No. 62/585,075, filed on Nov. 13, 2017.

(51) Int. Cl.
  *G10L 17/22* (2013.01)
  *G06F 21/32* (2013.01)
  (Continued)

(52) U.S. Cl.
  CPC .............. *G10L 17/22* (2013.01); *G06F 21/32* (2013.01); *G06K 9/00288* (2013.01); *G06K 9/00348* (2013.01); *G10L 15/02* (2013.01); *G10L 15/26* (2013.01); *G10L 17/02* (2013.01); *H04L 9/3226* (2013.01); *H04L 63/102* (2013.01)

(58) Field of Classification Search
  CPC ... H04L 63/0861; H04L 63/10; H04L 63/102; H04L 69/3226; G06F 21/32; G06K 9/00221; G06K 9/00892; G06K 9/00288; G06K 9/00348; G06Q 20/40145; G10L 17/06; G10L 17/00; G10L 17/22; G10L 2015/223; G10L 17/005; G10L 17/02; G10L 15/26; G10L 15/02; H04W 12/06; H04W 12/0602
  See application file for complete search history.

(56) References Cited

U.S. PATENT DOCUMENTS 5,229,764 A    7/1993  Matchett
6,490,624 B1 * 12/2002  Sampson .............. G06F 21/604
                                                  709/202

(Continued)

*Primary Examiner* — Angela A Armstrong
(74) *Attorney, Agent, or Firm* — Fish & Richardson P.C.

(57) ABSTRACT

Techniques are described for passive authentication based at least partly on collected voice data of a user. During a speech interaction between a user and a personal assistant (PA) device, the user's speech may be analyzed to authenticate the user. The authentication of the user may be a passive authentication, in which the user is not explicitly asked to provide authenticating credentials. Instead, the speech data of the user is collected during the user's interactions with the PA device, and the collected speech data is compared to a previously developed model of the user's speech. The user is successfully authenticated based on determining that there is sufficient correspondence between the collected speech data and the model of the user's speech. After the user is authenticated passively during the conversation, they may be able to access sensitive data or services that may not be otherwise inaccessible without authentication.

21 Claims, 4 Drawing Sheets

(51) Int. Cl.
  *H04L 9/32*    (2006.01)
  *G10L 17/02*   (2013.01)
  *H04L 29/06*   (2006.01)
  *G10L 15/26*   (2006.01)
  *G06K 9/00*    (2006.01)
  *G10L 15/02*   (2006.01)

(56) References Cited

U.S. PATENT DOCUMENTS

| | | |
|---|---|---|
| 6,728,884 B1 * | 4/2004 | Lim .................... H04L 63/0815 |
| | | 709/219 |
| 7,590,538 B2 | 9/2009 | St. John |
| 8,401,539 B2 | 3/2013 | Beenau |
| 8,965,770 B2 | 2/2015 | Petrushin |
| 9,007,473 B1 | 4/2015 | Worley, III |
| 9,082,055 B2 | 7/2015 | Breuer |
| 9,225,701 B2 | 12/2015 | Gongaware |
| 9,247,037 B2 | 1/2016 | Clark |
| 9,262,612 B2 * | 2/2016 | Cheyer ................... G06F 21/32 |
| 9,548,979 B1 * | 1/2017 | Johnson ............. H04L 63/0861 |
| 9,639,682 B2 | 5/2017 | North |
| 9,697,836 B1 | 7/2017 | Lousky |
| 9,710,983 B2 | 7/2017 | Asmar |
| 10,013,983 B1 * | 7/2018 | Johnson ................ H04L 63/083 |
| 10,515,639 B1 * | 12/2019 | Johnson ............ H04W 12/0602 |
| 2016/0021117 A1 | 1/2016 | Harmon |
| 2018/0137267 A1 * | 5/2018 | Krieger ................. G06F 21/316 |

* cited by examiner

PASSIVE AUTHENTICATION THROUGH VOICE DATA ANALYSIS

CROSS-REFERENCE TO RELATED APPLICATION

This application claims benefit under 35 U.S.C. § 119 to U.S. Application Ser. No. 62/585,075, filed on Nov. 13, 2017, titled "PASSIVE AUTHENTICATION THROUGH VOICE DATA ANALYSIS," the entire contents of which are incorporated by reference.

BACKGROUND

Various types of network-connected smart appliances, Internet of Things (IoT) devices, mobile devices, and/or other computing devices have become available to consumers. Such devices may serve a primary function (e.g., a washing machine washing clothes), while also providing smart capabilities for sensing its state and/or the state of the local environment, collecting state data, executing logic, communicating information to other devices over networks, and so forth. Different devices may have different capabilities with regard to data input and data output. For example, a device may accept audio input (e.g., speech input) and provide audio output, but may not include a display for visually presenting data, or may include a limited display that does not support a graphical user interface (GUI). As another example, a device such as a television may include a large display but may lack a full-featured user interface for inputting data.

SUMMARY

Implementations of the present disclosure are generally directed to authenticating a user based at least partly on audio information. More specifically, implementations are directed to collecting voice data from a user through a conversational user interface (CUI) of a device, passively authenticating the user based on the voice data, and controlling access to sensitive information based on the authentication of the user.

In general, innovative aspects of the subject matter described in this specification can be embodied in methods that include operations of: receiving speech data provided by a user during a speech interaction with a conversational user interface (CUI) executing on a computing device; analyzing the speech data to attempt a passive authentication of the user during the speech interaction, wherein the passive authentication is attempted based at least partly on the speech data and does not include explicitly prompting the user for a credential; receiving a request to access sensitive information associated with the user, the request submitted by the user through the CUI during the speech interaction; and in response to the request and based on a determination that the passive authentication of the user is successful, providing access to the sensitive information through the CUI.

Implementations can optionally include one or more of the following features: the speech data is further analyzed to identify the user among a plurality of users who are registered as users of the computing device; the operations further include based on a determination that the user has not been passively authenticated when the request is received, attempting to actively authenticate the user through the CUI; attempting to actively authenticate the user includes prompting the user to provide, through the CUI, one or more of a personal identification number (PIN), a password, and a passphrase; the operations further include receiving video data that is captured by at least one camera of the computing device; the video data is analyzed with the speech data to attempt to passively authenticate the user; analyzing the video data includes one or more of a facial recognition analysis, a posture recognition analysis, a gesture recognition analysis, and a gait recognition analysis; analyzing the speech data to attempt to passively authenticate the user includes: providing the speech data as input to a model of a speech pattern of the user, the model having been previously developed based on collected speech data of the user, receiving, from the model, a confidence metric indicating a likelihood that the speech data is spoken by the user, and determining that the user is authenticated based on the confidence metric exceeding a threshold value; the analyzed speech data is audio data that is recorded by at least one microphone of the computing device; the analyzed speech data is text data that is generated by transcribing at least a portion of audio data that is recorded by at least one microphone of the computing device; and/or the request to access the sensitive information includes one or more of: a request to access financial account information describing at least one account of the user, a request to perform a financial transaction involving at least one account of the user, and a request to perform a funds transfer involving at least one account of the user.

Other implementations of any of the above aspects include corresponding systems, apparatus, and computer programs that are configured to perform the actions of the methods, encoded on computer storage devices. The present disclosure also provides a computer-readable storage medium coupled to one or more processors and having instructions stored thereon which, when executed by the one or more processors, cause the one or more processors to perform operations in accordance with implementations of the methods provided herein. The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

Implementations of the present disclosure provide the following technical advantages and technical improvements over previously available solutions. Implementations provide for passive authentication that is performed unobtrusively based on collected speech data of the user during a conversation between the user and a personal assistant device, without explicitly asking or requiring the user to provide credentials (e.g., identifying information). Such passive authentication through speech data analysis is easy and transparent from the user's point of view, and provides a more favorable user experience compared to traditional authentication methods based on user-provided credentials. The passive authentication can be performed on an ongoing basis, such that the user is authenticated and access is available to sensitive information should the user request such information during a conversation with the personal assistant device. Because implementations perform passive authentication based on collected audio data, such authentication may be performed with higher confidence than traditional techniques for authenticating the user, given that the analysis may continue collecting and analyzing the user's speech data until authentication is successful. Accordingly, implementations make more efficient use of processing power, network bandwidth, active memory, storage space, and/or other computing resources that traditional authentication systems expend to recover from, and/or retry following, multiple failed authentication attempts based on inaccurately provided credentials. The passive authentication described herein is particularly advantageous on headless PA devices that may lack a display and/or other I/O components that would enable a user to enter traditional authentication credentials.

In some implementations, the authentication can take place on a personal assistant device and can be passed to another device for a limited period of time. For example, a user can authenticate on their in-home personal assistant device, and the authentication is passed to the user's car for a period of time. In some instances, this passed authentication can be for a subset of data and/or functionality on the receiving device.

In some implementations, the authentication can also be used without a personally owned device but by leveraging public access devices such as speaker systems, help lines, smart TVs, and/or other voice-enabled interactive systems. Passive authentication is particular advantage to control of Internet of Things (IoT) devices in a smart home or other type of connected ecosystem. For example, voice commands can be used to control a thermostat in a different building, room, or floor, and the commands can be validated as coming from an authenticated source. Passive authentication can also be used at a point of interaction such as an automated teller machine (ATM) and/or other type of automated teller or agent system and can perform operations for authentication as well as for emotion detection (e.g., to detect when a user is under duress), and take appropriate actions. Other applications include but are not limited to drone control, assisted technologies, banking and investments, and so forth.

It is appreciated that aspects and features in accordance with the present disclosure can include any combination of the aspects and features described herein. That is, aspects and features in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Figure 1:
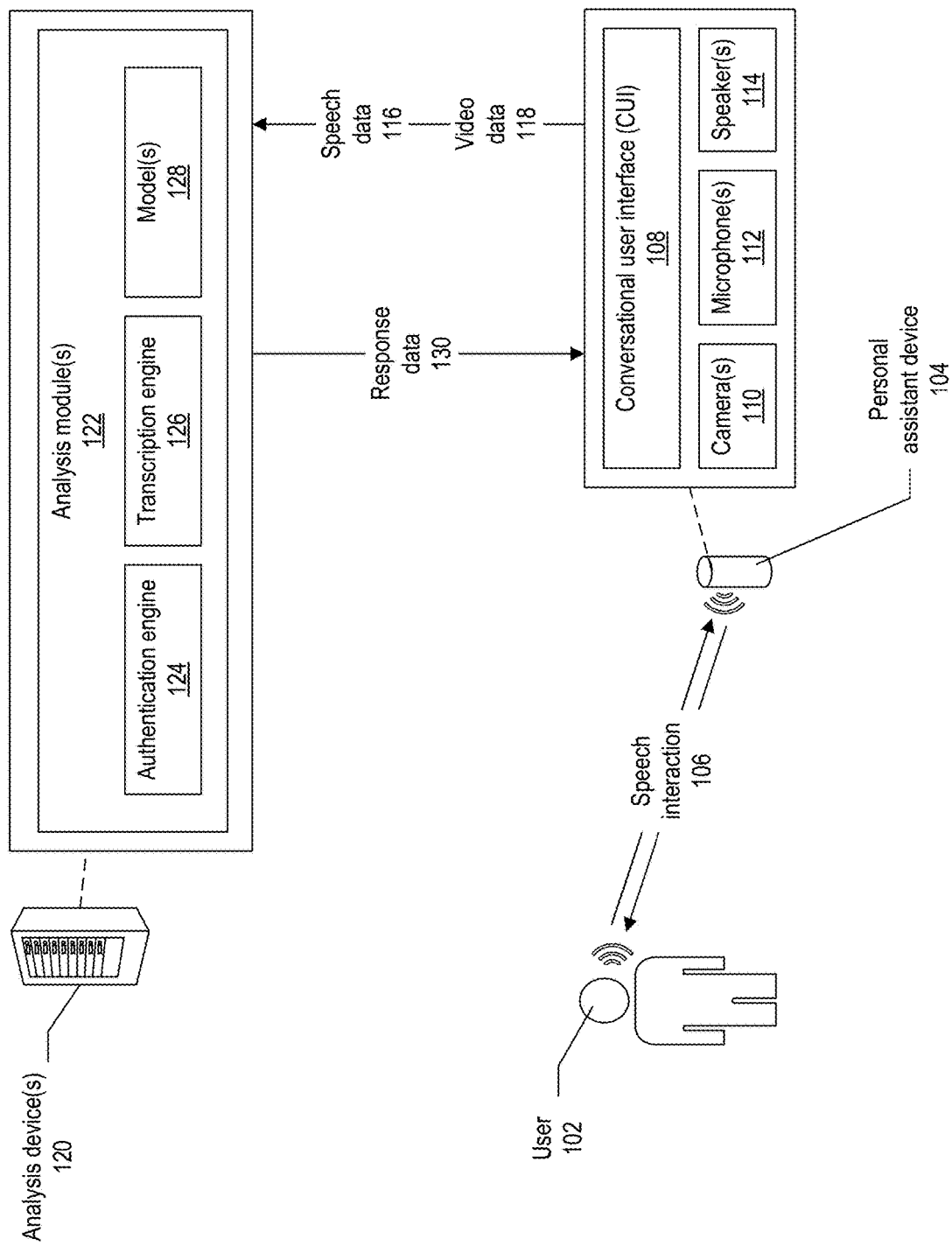
FIG. 1 depicts an example system for user authentication, according to implementations of the present disclosure.

Implementations of the present disclosure are directed to systems, devices, methods, and computer-readable media for passively authenticating a user based on speech data collected from a user during a conversation with a conversational user interface (CUI). A computing device, such as a personal assistant (PA) device, may interact with a user through a session that involves speech interactions. For example, the user may ask the CUI a question (e.g., "what is my checking account balance?"). The PA device can request relevant information from a remote server or, in some instances, retrieve the relevant information from local storage, and the CUI can provide speech output that answers the question (e.g., "two hundred seventeen dollars and 57 cents"). In this way, the user and the CUI may engage in a speech interaction (e.g., a conversation) in which the user requests information and the CUI responds appropriately if it is able to provide the requested information. In some instances, the PA device is a stand-alone computing device with components to receive speech input, provide speech output, process information, retrieve stored information, and/or communicate with other computing device(s) over one or more wired and/or wireless networks. For example, the PA device may be an Amazon Echo™.

During a speech interaction between a user and the PA device, the user-provided speech data may be analyzed to authenticate the user, e.g., to verify that the user is who they purport to be, and/or that the user is authorized to access certain data and/or service(s) that are secured against more general access by any individual or process. In some implementations, the authentication of the user is a passive authentication, in which the user is not explicitly asked to provide authenticating credentials such as a username, password, passphrase, personal identification number (PIN), biometric data, and so forth, and/or in which such credential(s) are not explicitly received from the user. Instead, the speech data of the user is collected during the user's interactions with the PA device, and the collected speech data is compared to a previously developed model of the user's speech. The user is successfully authenticated based on determining that there is sufficient correspondence between the collected speech data and the model of the user's speech. After the user is authenticated passively during the conversation, they may be able to access sensitive data or services that may not be otherwise inaccessible without authentication. For example, the user may be authorized to access financial account information, such as account balances, transaction history, and so forth, after the user has been passively authenticated through speech data collected during the conversation regarding other, non-sensitive information. Passive authentication based on collected speech data provides for user authentication that is unobtrusive and substantially transparent to the user (e.g., the user may not know the authentication is being performed) and thus provides a more positive user experience compared to traditional authentication techniques.

FIG. 1 depicts an example system for user authentication, according to implementations of the present disclosure. As shown in the example of FIG. 1, a user 102 may interact with a PA device 104 in an environment. The environment may be a building such as a house or a room within a building. The environment may also be at least partly outdoors. In some instances, the PA device 104 is any suitable type of personal assistant and/or artificial intelligence (AI) powered device, such as the Amazon Echo™. The PA device 104 may be a headless device that lacks a display for visual output, or that includes a limited display that is not able to present a rich GUI such as that of a smartphone, tablet computer, or other type of computing device.

In some instances, the PA device 104 may be configured to execute a CUI 108 that receives speech data input from a user 102 and responds with speech data output to the user.

The speech data that is received from the user 102 and output from the PA device 104 may be described as a speech interaction 106 (conversation) between the user 102 and the PA device 104. A CUI 108 may be designed to mimic or simulate a conversation with a real human, such that a user 102 can interact with the CUI 108, and with the PA device 104, at least partly through a voice conversation.

The PA device 104 can include one or more cameras 110 that capture video data 118 of area(s) in proximity to the PA device 104, such as video data 118 of the user 102 while the user is (or is not) engaged in the speech interaction 106 with the PA device. The video data 118 can include video in any suitable size and format, such as a version of the MPEG-4 or MP4 format. The video data 118 can also include any appropriate number of still images, in any appropriate format.

The PA device 104 can also include one or more microphones 112 for receiving and recording audio data, such as the speech data 116 from the user 102. The PA device 104 can also include one or more speakers 114 for providing output audio data, such as the speech data generated and played by the PA device 104 during the speech interaction 106 with the user 102. The audio data can be processed using any suitable audio data format. The PA device 104 can support any appropriate natural language for receiving audio input and providing audio output.

In some instances, the PA device 104 can include other capabilities for data input and/or data output. Data input capabilities may include a display of any suitable type, such as a liquid crystal display (LCD) or light-emitting diode (LED) display, that is suitable for presenting an interface such as graphical user interface (GUI), command-line interface, or other type of interface, and receiving user input through the interface. Data input capabilities may include audio input component(s) such as the one or more microphones 112 configured to receive audio (e.g., speech) input from a user 102, and software components to analyze and/or transcribe the audio input, such as speech-to-text (STT) module(s), semantic analysis module(s), voice recognition module(s), and so forth. Data input capabilities may also include haptic input component(s) that detect vibrations, rotations, impacts, and/or other movements of the PA device 104, such as movements caused by a user. Data input capabilities may also include any suitable number of hard controls on the PA device 104, such as hardware implemented buttons, knobs, slider controls, switches, toggles, keyboards, joysticks, mouse controllers, touchpads, touchscreens, and so forth. Implementations also support other appropriate types of data input capabilities.

Data output capabilities of the PA device 104 may include a display of any suitable type, such as a LCD or LED display, that is suitable for presenting a GUI, other types of graphics, images, video content, text data, and so forth. Data output capabilities may include audio output component(s) such as the speaker(s) 114. Data output capabilities may include haptic output component(s) such as haptic actuator(s) configured to vibrate and/or otherwise move at least a portion of a PA device 104 in response to signal(s). Data output capabilities may include any suitable number and/or type of hardware implemented outputs such as LEDs on a client device. Implementations also support other appropriate types of data output capabilities.

In some implementations, the speech data 116 that is collected during the speech interaction 106 is communicated over one or more networks to one or more analysis devices 120. The analysis device(s) 120 may include any appropriate number and/or type of computing device. The analysis device(s) 120 may execute one or more analysis modules 122 to analyze the speech data 116 and, based on the analysis, authenticate the user 102. The analysis module(s) 122 may include an authentication engine 124, a transcription engine 126, and one or more models 128.

The model(s) 128 may each correspond to a particular user 102, and a model 128 may describe the typical speech patterns of the respective user 102. In some implementations, the analyzed speech data 116 may be a transcription of the audio data that records the user's speech. In such instances, the speech data 116 that is communicated from the PA device 104 to the analysis device(s) 120 may be at least a partial transcript of the audio data of the user's speech, generated through transcription performed by the CUI 108 and/or some other software module executing on the PA device 104. Alternatively, the speech data 116 that is communicated from the PA device 104 to the analysis device(s) 120 may be the recorded audio data, and the audio data may be transcribed by the transcription engine 126 executing on the analysis device(s) 120. In either case, the transcription may produce text data that is at least a partial transcript of the user's speech. In such implementations, the model 128 of a user's speech may model the particular vocabulary, grammar, syntax, and/or other textual characteristics of the user's speech. The authentication engine 124 may provide the transcribed speech data as input to the model 128 for the particular user 102, and the model may compare the transcribed speech data to the modeled characteristics of the user's speech to determine a probability that the speaker corresponds to the modeled user. If the probability of a match that is output by the model exceeds a predetermined threshold, the authentication engine 124 may determine that the user 102 has been successfully authenticated.

In some implementations, the analyzed speech data 116 may be the (e.g., raw) audio data of the user's recorded voice. In such implementations, the model 128 of a user's speech may model the particular grammar, syntax, vocabulary, and/or other textual characteristics, and/or the audio characteristics of the user's speech such as pitch, timbre, volume, pace and/or rhythm of speaking, pause patterns, and/or other audio characteristics. The authentication engine 124 may provide the audio data as input to the model 128 for the particular user 102, and the model may compare the audio data to the modeled characteristics of the user's speech to determine a probability that the speaker corresponds to the modeled user. If the probability of a match that is output by the model exceeds a predetermined threshold, the authentication engine 124 may determine that the user 102 has been successfully authenticated.

In some implementations, the authentication of the user 102 is based on video data 118 in addition to speech data 116. For example, the camera(s) 110 in the PA device 104 may capture video and/or still image(s) of the user's face and/or other body parts, and the video data 118 may be provided as input to the model(s) 128. The model(s) 128 may model feature(s) of the user and/or movements of the user in addition to modeling speech characteristics, and the use of the video data 118 may provide a higher-confidence verification of the user's identity compared to verification using audio data without using video data 118. For example, the model 128 may analyze image(s) of the user's face and/or body, and/or video of the user's facial expressions, gestures, gait, and/or other aspects of the user's behavior, to authenticate the user 102.

Based on a successful authentication of the user 102, the analysis device(s) 120 may communicate response data 130 to the PA device 104. In some implementations, the response data 130 may indicate whether the user 102 has been authenticated. In some instances, the response data 130 can include sensitive information that the user 102 has requested. Based on a successful passive authentication of the user 102 based on the user's speech data, the request for sensitive information may be approved and the sensitive data can be sent to the PA device 104 to be output, through the CUI 108, to the user 102.

Figure 2:
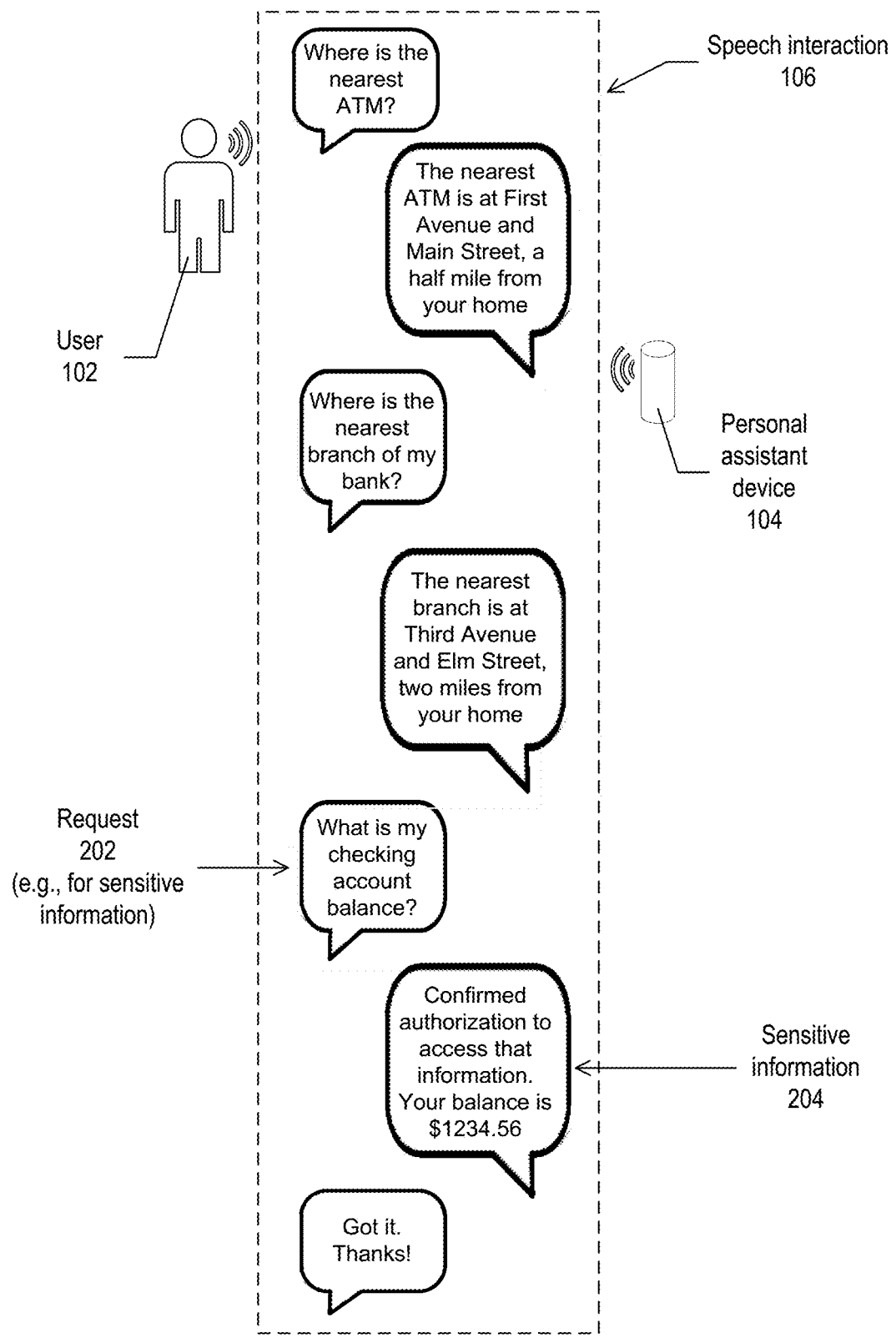
FIG. 2 depicts an example speech interaction between a user and a personal assistant device, according to implementations of the present disclosure.

FIG. 2 depicts an example speech interaction 106 between a user 102 and a PA device 104, according to implementations of the present disclosure. In this example, the user 102 is engaged in a speech interaction 106 (conversation) with the CUI 108 of the PA device 104, and the user 102 is initially asking questions regarding public and/or otherwise non-sensitive information, such as locations of automated teller machines (ATMs) and bank branches. During this discussion regarding non-sensitive subject matter, the speech data of the user 102 is collected and analyzed in an attempt to passively authenticate the user 102, e.g., authenticate the user 102 without explicitly asking the user 102 to provide credentials (e.g., identifying data). At some point during the non-sensitive conversation, the user 102 may change the topic to one that involves sensitive information. In the example shown, after discussing ATM and bank branch locations, the user 102 speaks a request 202 for sensitive information such as a checking account balance. Because this sensitive information may not be provided to any individual generally, given its private nature, the sensitive information 204 (e.g., the current account balance) may be output by the CUI 108 if the user 102 has been previously authenticated (passively or otherwise).

In some implementations, the analysis device(s) 120 store session information that describes one or more sessions involving speech interactions between the user 102 and the PA device 104. The session information for a session may include an indication whether the user 102 has been authenticated during the particular session. In some instances, an authentication of the user 102 may have a time-to-live (TTL), such that a user may be re-authenticated if sufficient time has passed since the last authentication of the user (passive or otherwise). A session may be deemed as complete if a certain period of time passes with no speech interaction between the user and the PA device. In some implementations, the start of a new session may trigger a new attempt to passively authenticate the user 102 based on speech data and/or video data, even in instances where the user 102 had been successfully authenticated during a prior session. In some implementations, the session information may be stored externally to the analysis device(s) 120 on storage device(s) that are accessible by the analysis device(s) 120 over one or more networks.

In some implementations, the analysis device(s) 120 may provide various service(s) to user(s) 102. The service(s) may include financial service(s) associated with banking, investment management, lending, home financing, and so forth. In some instances, the service(s) may include insurance service(s) for health insurance, vehicle insurance, life insurance, homeowner's insurance, and so forth. Implementations also support other types of service(s). The user 102 may be provided with information associated with the various services. In some instances, the sensitive information can include information related to these services. For example, sensitive information may include account balances and/or transaction history related to financial accounts, insurance claims status related to an insurance policy, and so forth. Sensitive information may also include requests for operations to be performed, where such operations may involve some risk of fraud, theft, or other harm if they were performed for unauthorized individuals. For example, a user's request for sensitive information may be the user 102 requesting a funds transfer from one financial account to another. If the user 102 makes such a request through the PA device 104, the transfer may be performed if the user 102 has been authenticated.

Figure 3:
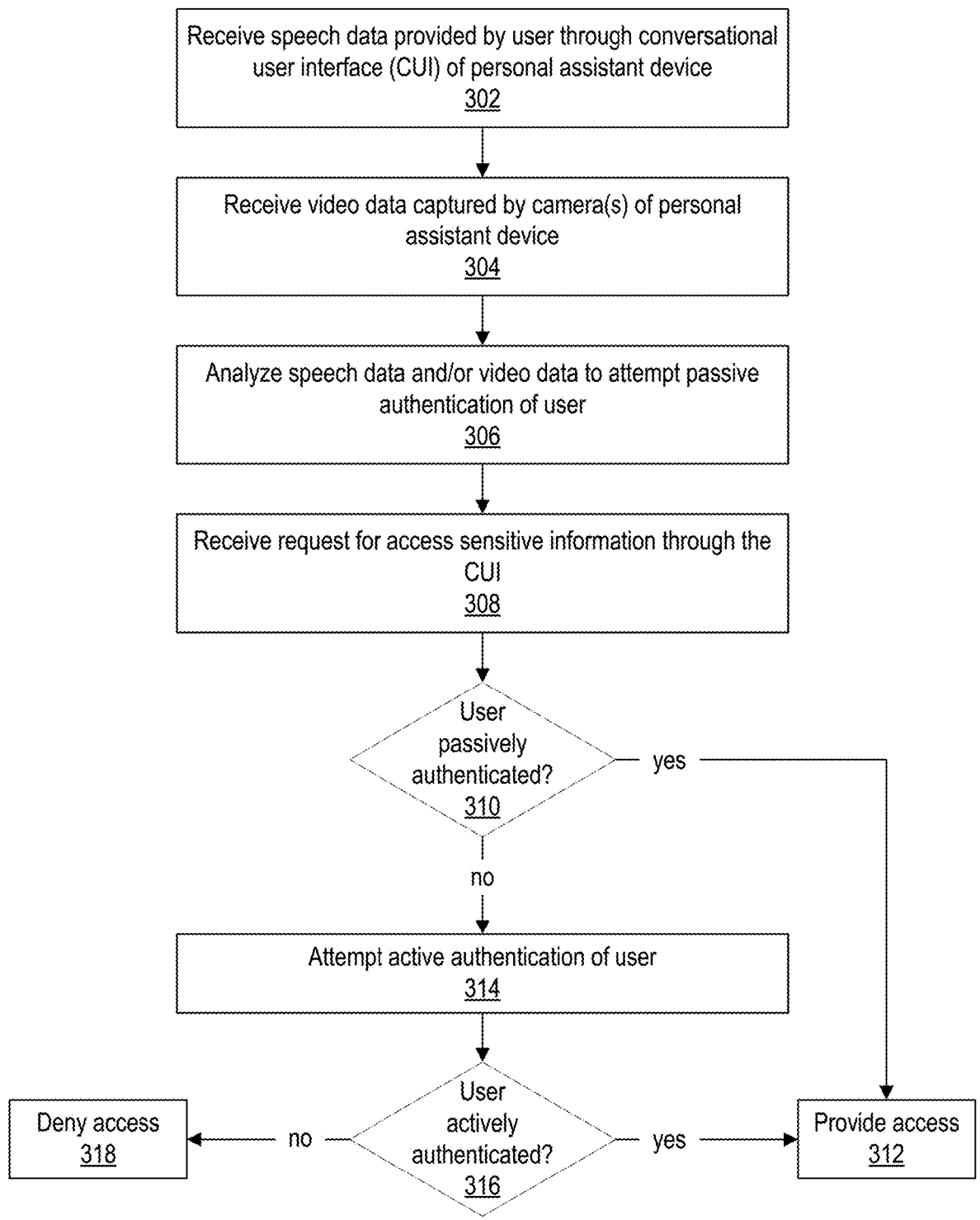
FIG. 3 depicts a flow diagram of an example process for authenticating a user, according to implementations of the present disclosure.

FIG. 3 depicts a flow diagram of an example process for authenticating a user 102, according to implementations of the present disclosure. Operations of the process may be performed by one or more of the CUI 108, the analysis module(s) 122, the authentication engine 124, the transcription engine 126, the model(s) 128, and/or other module(s) of the PA device 104, the analysis device(s) 120, and/or other device(s).

The speech data 116 is received (302). As described above, the speech data may be collected through the CUI 108 of the PA device 104 during a conversation between the user 102 and the CUI 108. The speech data 116 may be transcribed recorded audio data of the user's speech, and/or the (e.g., raw) recorded audio data of the user's speech.

In some implementations, video data 118 is also received (304). As described above, the video data 118 may include video and/or still image(s) in any suitable format, and may be captured by camera(s) 110 that are component(s) of the PA device 104 and/or external to the PA device 104.

The speech data 116 and/or video data 118 is analyzed to attempt a passive authentication of the user 102, as described above. The passive authentication may be based on speech data 116 and/or video data 118 that is received (e.g., on an ongoing basis) during the user's conversation with the CUI 108.

A request for sensitive information may be received (308) during the conversation between the user 102 and the CUI 108. On receiving such a request, a determination may be made (310) whether the user 102 has been passively authenticated yet. If so, the requested sensitive information and/or access to sensitive information or sensitive operations may be provided (312).

Passive authentication, in which the user is not explicitly asked or required to provide a credential and in which a credential is not explicitly received from the user, can be distinct from active authentication, in which the user is explicitly prompted to provide at least one credential and/or the user explicitly provides at least one credential. If the user 102 has not yet been passively authenticated when the request for sensitive information is received, an attempt may be performed (314) to actively authenticate the user 102. Such active authentication may include asking the user 102 to provide credential(s), such as a username, password, passphrase, PIN, answers to knowledge-based questions (e.g., what is your mother's maiden name?), biometric data (e.g., image(s) of face, voice print data, heart rate, fingerprint(s), etc.), and so forth, and/or receiving the asked-for credential(s) provided by (or collected from) the user in response. In some implementations, active authentication may include sending a one-time passcode to the user's personal computing device, such as a smartphone, and prompting the user 102 to speak the one-time passcode to the PA device 104 to be authenticated. In some implementations, active authentication may include prompting the user 102 to log into an application on their personal computing device, by providing credentials (e.g., username, password, etc.), biometric data (e.g., fingerprint swipe, etc.), and/or through other modes of authentication.

If the user 102 is successfully authenticated through active authentication (316), the requested access to sensitive information is provided (312). If the user is not successfully authenticated through active authentication, the access is denied (318). In such instances, the user 102 may be prompted to log into an application on their personal computing device to retrieve the requested information. Alternatively, the user 102 may be prompted to continue discussing non-sensitive topics with the PA device 104 until the user can be successfully authenticated passively based on the speech data captured during such discussion.

Implementations provide a passive authentication that is performed unobtrusively, without requiring the user to explicitly provide credentials or other identifying information, through speech data analysis that is easy and transparent from the user's point of view. The passive authentication can be performed on an ongoing basis, such that the user is authenticated and access is available to sensitive information should the user request such information during a conversation with the PA device.

In some implementations, the model 128 for a user's speech and/or appearance may be trained or otherwise developed using one or more suitable machine learning (ML) techniques. In such implementations, the successful or unsuccessful passive authentication of the user, and/or the successful or unsuccessful action authentication of the user, may be used for further train and/or otherwise refine the model to provide a more accurate result. For example, if the user is successfully actively authenticated following an unsuccessful attempt at passive authentication, the model may be refined to incorporate the speech data and/or video data characteristics that were previously provided and led to the unsuccessful passive attempt. Accordingly, the model may, during subsequent authentication attempts, be more likely to successfully passively authenticate the user if the same or similar speech data and/or video data is provided during the subsequent attempts. In this way, the model for a user may be retrained and/or refined over time to provide a more accurate determination of the user's identity. Moreover, the retraining of the model over time may account for changes in the user's speech and/or appearance with age, season of the year, time of day, and so forth.

Some implementations, the authentication of the user may be based on comparison of collected speech data and/or video data to a model of an individual who is a registered user of the PA device 104, to determine whether the person speaking or otherwise in proximity to the PA device is the registered user of the PA device 104. In instances where, there are multiple individuals who are registered users of the PA device 104, such as in a home with multiple family members or other occupants, the analysis of the speech data and/or video data may also include an initial determination of which individual is speaking and/or in proximity to the PA device 104. The model of the determined individual may then be compared to the collected speech data and/or video data to authenticate the user. Alternatively, the collected speech data and/or video data may be provided to multiple models associated with the various registered users of the PA device 104 and, if a correspondence (e.g., match) is found with at least one of the model(s), a determination may be made that the speaker is the user associated with the model and that the speaker is authenticated as that user, and authorized to access sensitive information associated with that user.

Figure 4:
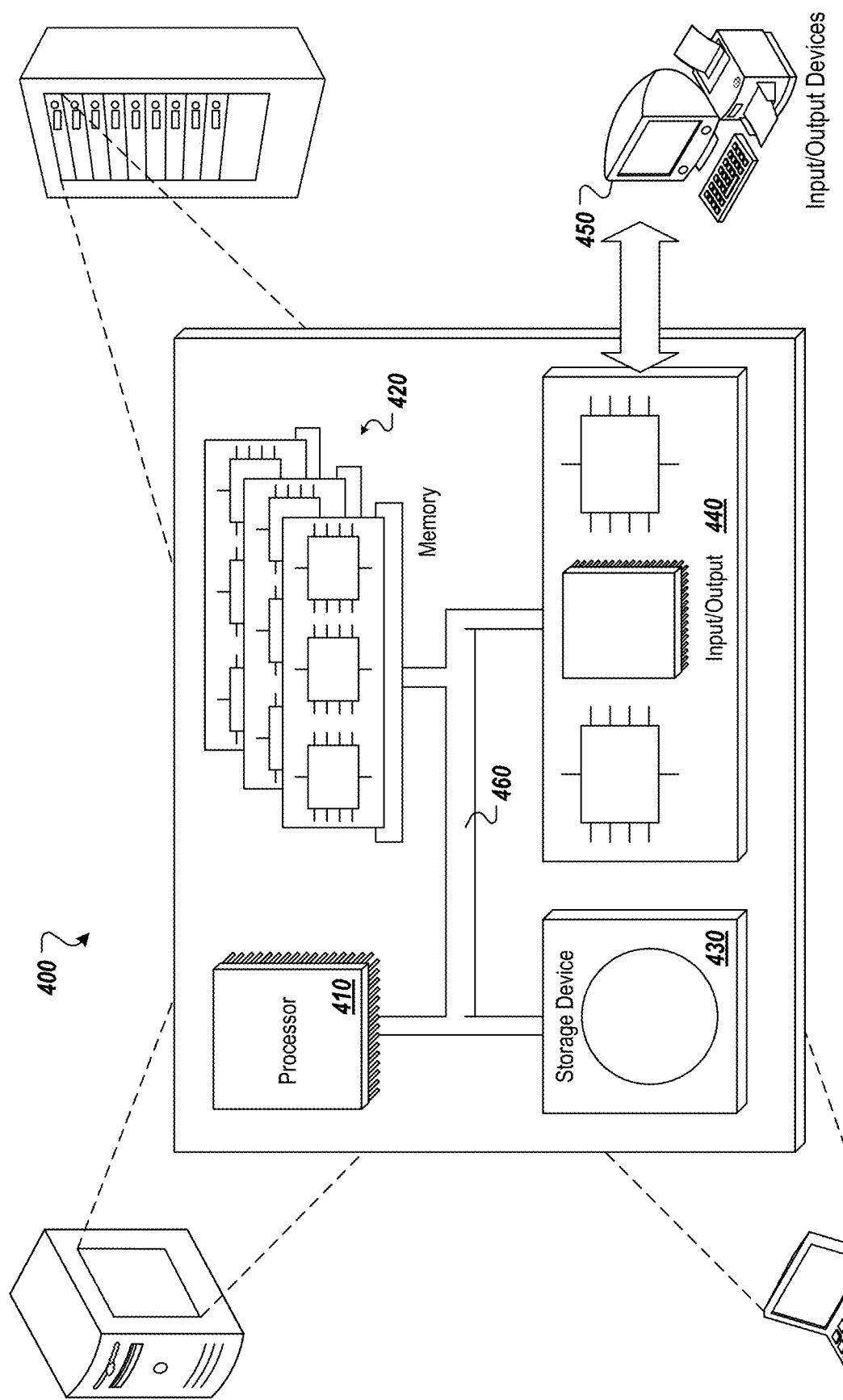
FIG. 4 depicts an example computing system, according to implementations of the present disclosure.

FIG. 4 depicts an example computing system, according to implementations of the present disclosure. The system 400 may be used for any of the operations described with respect to the various implementations discussed herein. For example, the system 400 may be included, at least in part, in one or more of the PA device 104, the analysis device(s) 120, and/or other computing device(s) or system(s) described herein. The system 400 may include one or more processors 410, a memory 420, one or more storage devices 430, and one or more input/output (I/O) devices 450 controllable through one or more I/O interfaces 440. The various components 410, 420, 430, 440, or 450 may be interconnected through at least one system bus 460, which may enable the transfer of data between the various modules and components of the system 400.

The processor(s) 410 may be configured to process instructions for execution within the system 400. The processor(s) 410 may include single-threaded processor(s), multi-threaded processor(s), or both. The processor(s) 410 may be configured to process instructions stored in the memory 420 or on the storage device(s) 430. The processor(s) 410 may include hardware-based processor(s) each including one or more cores. The processor(s) 410 may include general purpose processor(s), special purpose processor(s), or both.

The memory 420 may store information within the system 400. In some implementations, the memory 420 includes one or more computer-readable media. The memory 420 may include any number of volatile memory units, any number of non-volatile memory units, or both volatile and non-volatile memory units. The memory 420 may include read-only memory, random access memory, or both. In some examples, the memory 420 may be employed as active or physical memory by one or more executing software modules.

The storage device(s) 430 may be configured to provide (e.g., persistent) mass storage for the system 400. In some implementations, the storage device(s) 430 may include one or more computer-readable media. For example, the storage device(s) 430 may include a floppy disk device, a hard disk device, an optical disk device, or a tape device. The storage device(s) 430 may include read-only memory, random access memory, or both. The storage device(s) 430 may include one or more of an internal hard drive, an external hard drive, or a removable drive.

One or both of the memory 420 or the storage device(s) 430 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 400. In some implementations, the CRSM may include a data store that provides storage of computer-readable instructions or other information in a non-transitory format. The CRSM may be incorporated into the system 400 or may be external with respect to the system 400. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 410 and the memory 420 may be supplemented by, or incorporated into, one or more application-specific integrated circuits (ASICs).

The system 400 may include one or more I/O devices 450. The I/O device(s) 450 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 450 may also include one or more output devices such as a display, LED(s), an audio output device (e.g., a speaker), a printer, a haptic output device, and so forth. The I/O device(s) 450 may be physically incorporated in one or more computing devices of the system 400, or may be external with respect to one or more computing devices of the system 400.

The system 400 may include one or more I/O interfaces 440 to enable components or modules of the system 400 to control, interface with, or otherwise communicate with the I/O device(s) 450. The I/O interface(s) 440 may enable information to be transferred in or out of the system 400, or between components of the system 400, through serial communication, parallel communication, or other types of communication. For example, the I/O interface(s) 440 may comply with a version of the RS-232 standard for serial ports, or with a version of the IEEE 1284 standard for parallel ports. As another example, the I/O interface(s) 440 may be configured to provide a connection over Universal Serial Bus (USB) or Ethernet. In some examples, the I/O interface(s) 440 may be configured to provide a serial connection that is compliant with a version of the IEEE 1394 standard.

The I/O interface(s) 440 may also include one or more network interfaces that enable communications between computing devices in the system 400, or between the system 400 and other network-connected computing systems. The network interface(s) may include one or more network interface controllers (NICs) or other types of transceiver devices configured to send and receive communications over one or more networks using any network protocol.

Computing devices of the system 400 may communicate with one another, or with other computing devices, using one or more networks. Such networks may include public networks such as the internet, private networks such as an institutional or personal intranet, or any combination of private and public networks. The networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 400 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical UI or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

The invention claimed is:

1. A computer-implemented method performed by at least one processor, the method comprising:
   receiving, by the at least one processor, speech data provided by a user during a speech interaction with a conversational user interface (CUI) executing on a computing device;
   analyzing, by the at least one processor, the speech data to attempt a passive authentication of the user during the speech interaction, wherein the passive authentication is attempted based at least partly on the speech data and does not include explicitly prompting the user for a credential;
   storing, by the at least one processor, session information related to the speech interaction with the CUI, the session information including an indication of whether the passive authentication of the user has been successful during the speech interaction;
   in response to determining that the passive authentication of the user has been successful during the speech interaction, storing, with the session information, a time value that indicates a period of time following a cessation of speech interaction between the user and the CUI after which the successful passive authentication expires;
   receiving, by the at least one processor, a request to access sensitive information associated with the user, the request submitted by the user through the CUI during the speech interaction; and
   in response to the request: a) determining, from the session information, that the user has been successfully authenticated during the speech interaction, and b) based on the determination that the user has been successfully authenticated, providing, by the at least one processor, access to the sensitive information through the CUI.

2. The method of claim 1, wherein the speech data is further analyzed to identify the user among a plurality of users who are registered as users of the computing device.

3. The method of claim 1, further comprising:
   based on a determination that the passive authentication has expired when the request is received, attempting, by the at least one processor, to actively authenticate the user through the CUI.

4. The method of claim 3, wherein attempting to actively authenticate the user includes prompting the user to provide, through the CUI, one or more of a personal identification number (PIN), a password, and a passphrase.

5. The method of claim 1, further comprising:
receiving, by the at least one processor, video data that is captured by at least one camera of the computing device;
wherein the video data is analyzed with the speech data to attempt to passively authenticate the user.

6. The method of claim 5, wherein analyzing the video data includes one or more of a facial recognition analysis, a posture recognition analysis, a gesture recognition analysis, and a gait recognition analysis.

7. The method of claim 1, wherein analyzing the speech data to attempt to passively authenticate the user includes:
providing the speech data as input to a model of a speech pattern of the user, the model having been previously developed based on collected speech data of the user;
receiving, from the model, a confidence metric indicating a likelihood that the speech data is spoken by the user; and
determining that the user is authenticated based on the confidence metric exceeding a threshold value.

8. The method of claim 1, wherein the analyzed speech data is audio data that is recorded by at least one microphone of the computing device.

9. The method of claim 1, wherein the analyzed speech data is text data that is generated by transcribing at least a portion of audio data that is recorded by at least one microphone of the computing device.

10. The method of claim 1, wherein the request to access the sensitive information includes one or more of:
a request to access financial account information describing at least one account of the user;
a request to perform a financial transaction involving at least one account of the user; and
a request to perform a funds transfer involving at least one account of the user.

11. A system, comprising:
at least one processor; and
a memory communicatively coupled to the at least one processor, the memory storing instructions which, when executed by the at least one processor, cause the at least one processor to perform operations comprising:
receiving speech data provided by a user during a speech interaction with a conversational user interface (CUI) executing on a computing device;
analyzing the speech data to attempt a passive authentication of the user during the speech interaction, wherein the passive authentication is attempted based at least partly on the speech data and does not include explicitly prompting the user for a credential;
storing session information related to the speech interaction with the CUI, the session information including an indication of whether the passive authentication of the user has been successful during the speech interaction;
in response to determining that the passive authentication of the user has been successful during the speech interaction, storing, with the session information, a time value that indicates a period of time following a cessation of speech interaction between the user and the CUI after which the successful passive authentication expires;
receiving a request to access sensitive information associated with the user, the request submitted by the user through the CUI during the speech interaction; and
in response to the request: a) determining, from the session information, that the user has been successfully authenticated during the speech interaction, and b) based on the determination that the user has been successfully authenticated, providing, by the at least one processor, access to the sensitive information through the CUI.

12. The system of claim 11, wherein the speech data is further analyzed to identify the user among a plurality of users who are registered as users of the computing device.

13. The system of claim 11, the operations further comprising:
based on a determination that the passive authentication has expired when the request is received, attempting, by the at least one processor, to actively authenticate the user through the CUI.

14. The system of claim 13, wherein attempting to actively authenticate the user includes prompting the user to provide, through the CUI, one or more of a personal identification number (PIN), a password, and a passphrase.

15. The system of claim 11, the operations further comprising:
receiving video data that is captured by at least one camera of the computing device;
wherein the video data is analyzed with the speech data to attempt to passively authenticate the user.

16. The system of claim 15, wherein analyzing the video data includes one or more of a facial recognition analysis, a posture recognition analysis, a gesture recognition analysis, and a gait recognition analysis.

17. The system of claim 11, wherein analyzing the speech data to attempt to passively authenticate the user includes:
providing the speech data as input to a model of a speech pattern of the user, the model having been previously developed based on collected speech data of the user;
receiving, from the model, a confidence metric indicating a likelihood that the speech data is spoken by the user; and
determining that the user is authenticated based on the confidence metric exceeding a threshold value.

18. The system of claim 11, wherein the analyzed speech data is audio data that is recorded by at least one microphone of the computing device.

19. The system of claim 11, wherein the analyzed speech data is text data that is generated by transcribing at least a portion of audio data that is recorded by at least one microphone of the computing device.

20. One or more non-transitory computer-readable media storing instructions which, when executed by at least one processor, cause the at least one processor to perform operations comprising:
receiving speech data provided by a user during a speech interaction with a conversational user interface (CUI) executing on a computing device;
analyzing the speech data to attempt a passive authentication of the user during the speech interaction, wherein the passive authentication is attempted based at least partly on the speech data and does not include explicitly prompting the user for a credential;
storing session information related to the speech interaction with the CUI, the session information including an indication of whether the passive authentication of the user has been successful during the speech interaction;

in response to determining that the passive authentication of the user has been successful during the speech interaction, storing, with the session information, a time value that indicates a period of time following a cessation of speech interaction between the user and the CUI after which the successful passive authentication expires;

receiving a request to access sensitive information associated with the user, the request submitted by the user through the CUI during the speech interaction; and in response to the request: a) determining, from the session information, that the user has been successfully authenticated during the speech interaction, and b) based on the determination that the user has been successfully authenticated, providing, by the at least one processor, access to the sensitive information through the CUI.

21. The method of claim 3, further comprising:

determining that the active authentication of the user is successful; and in response, applying the speech data from the speech interaction with the CUI to refine a model of the user's speech.

\* \* \* \* \*